June 7, 1966    J. MOSS    3,254,906
CHECKBOOK
Filed March 11, 1964    3 Sheets-Sheet 1
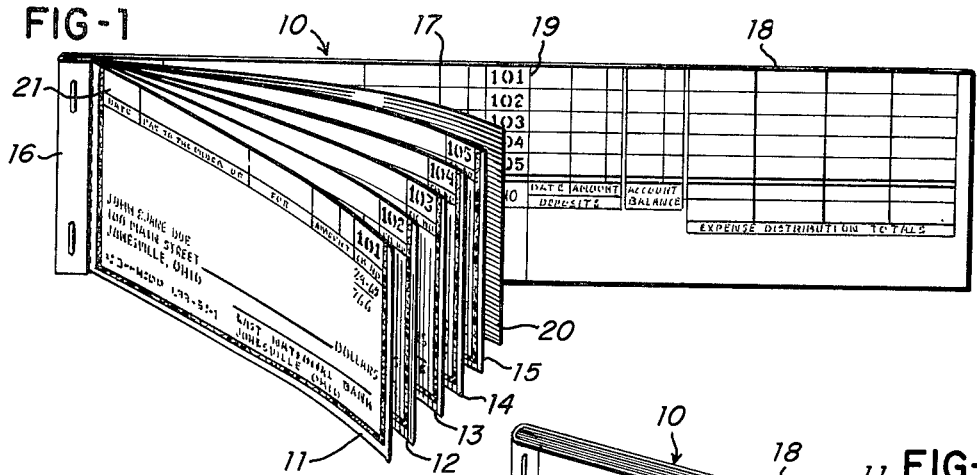
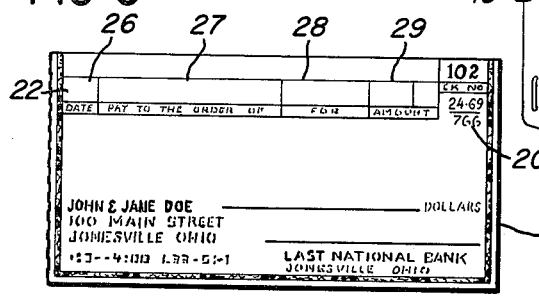
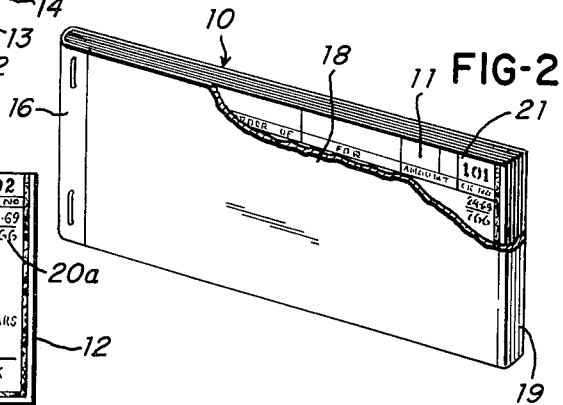
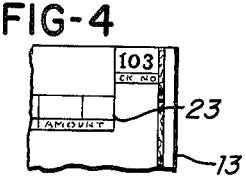 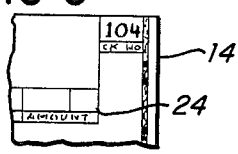 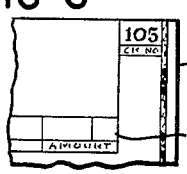 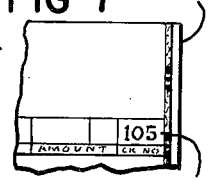
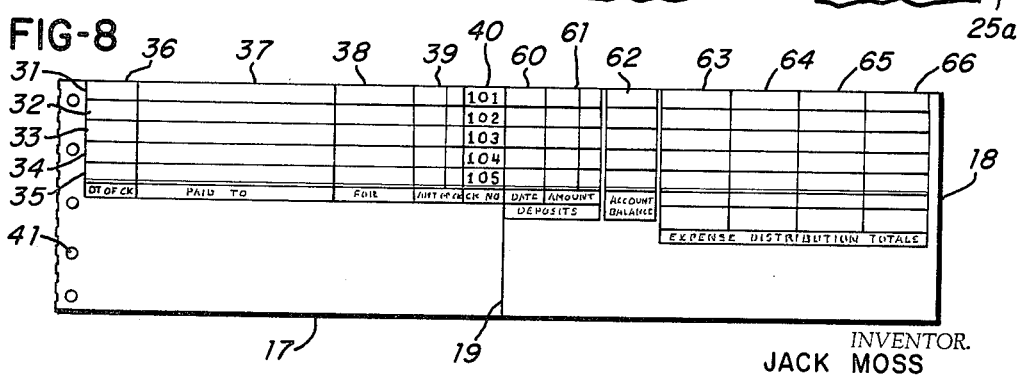
INVENTOR.
JACK MOSS
BY
Reuben J Wolk
ATTORNEY June 7, 1966     J. MOSS     3,254,906
CHECKBOOK
Filed March 11, 1964     3 Sheets-Sheet 2
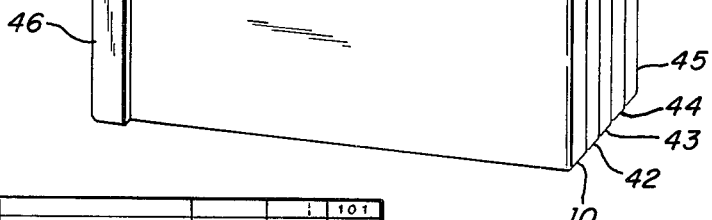
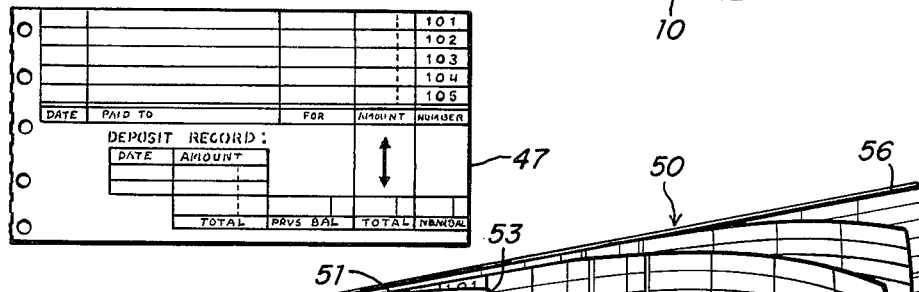
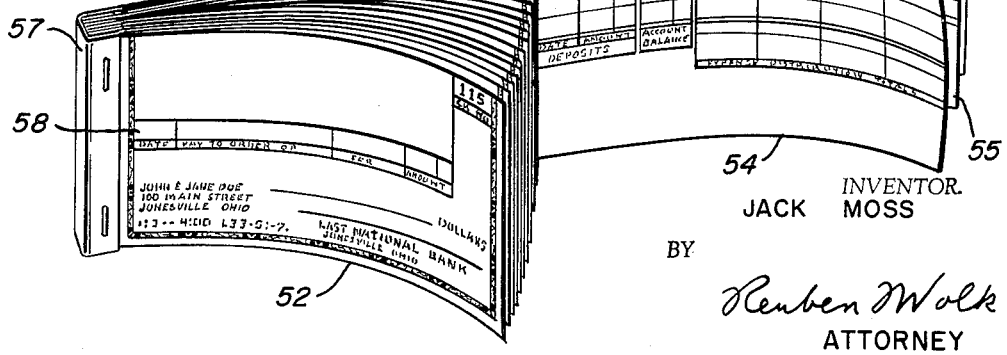
INVENTOR.
JACK MOSS
BY Reuben Wolk
ATTORNEY June 7, 1966 J. MOSS 3,254,906
CHECKBOOK
Filed March 11, 1964 3 Sheets-Sheet 3
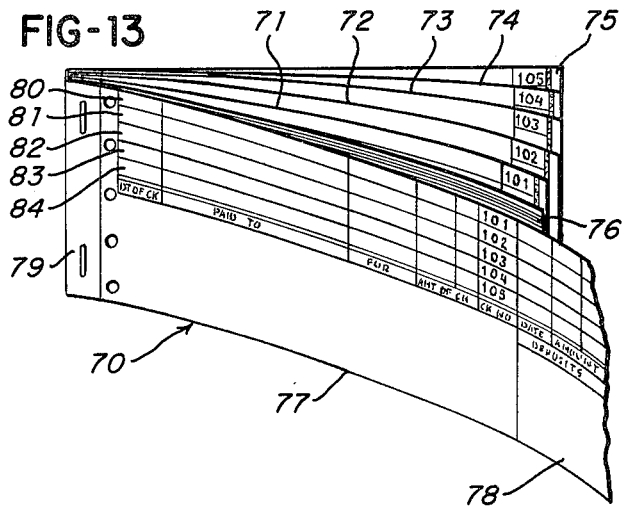
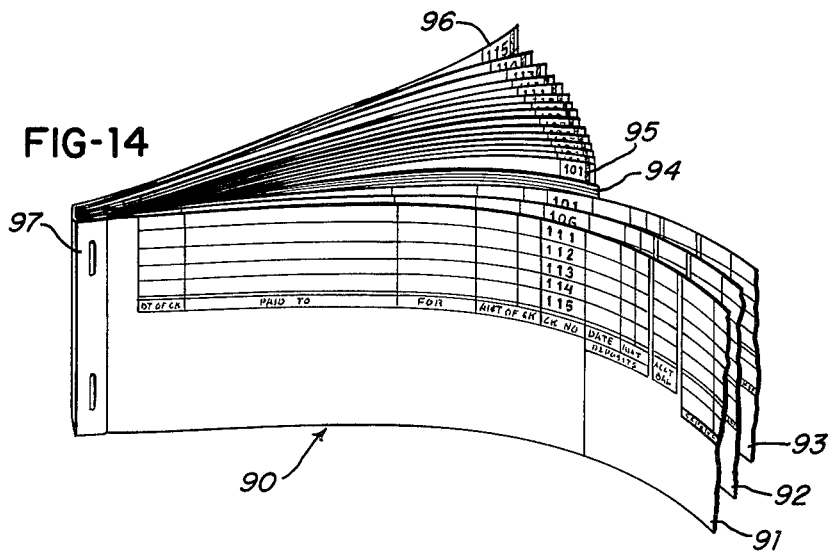
INVENTOR.
JACK MOSS
BY
Reuben Wolk
ATTORNEY

United States Patent Office 3,254,906
Patented June 7, 1966

3,254,906
CHECKBOOK
Jack Moss, 101 Greenhill Road, Dayton 6, Ohio
Filed Mar. 11, 1964, Ser. No. 351,061
6 Claims. (Cl. 282—23)

This invention relates to a portable checkbook of the type in which the important information is simultaneously placed on each check and on a permanent record or journal sheet without the need to rewrite this information. More specifically, the invention relates to such a book in which a number of fully superimposed removable checks are placed in sequence in registry with the record sheet so that salient information appearing on the checks is sequentially recorded on the record sheet which may be used for columnar tabulation. The invention further relates to a record system which may be built up of a number of the record sheets, sequentially arranged.

The most popular type of checkbook is portable; that is, the type usually carried by men in their pockets or by women in their purses. In this type of book, basic information must be written on the check itself; namely, the date, payee, amount, check number, and (optionally) the purpose of payment; the identical information must then *again* be written on some type of stub or separate record sheet. There are numerous disadvantages to this method; the extra labor and time required in duplicating the data; the possibility of errors in repeating the information; and the unfortunate tendency of many individuals to forget to record the information. The latter two disadvantages can lead to disastrous bookkeeping errors, embarrassing situations involving suppliers; charges for overdrawing accounts, and the like. To keep pace with our modern business methods, checkbooks should be improved, and it is to this end that applicant has devised the checkbook that is the subject of the present application.

While there have been attempts in the prior art to overcome these problems, they have only partially succeeded. In United States Patents Nos. 3,058,758 and 3,048,426, for example, the inventors have suggested that data recorded on the check be further recorded on a second sheet. The individual, however, is left with a stack of uncorrelated carbon copies. Applicant's solution is much more logical, providing that data placed on a group of superimposed checks be also carried on a *single* record sheet which then contains the data in proper sequence. Further, applicant has devised the checks within the group to be so arranged that information placed on one check will not be transmitted to an underlying check. The record sheet may then be used for columnar tabulation. Finally, applicant's novel concept extends to a further correlation of a group of the record sheets into a master record of desired size. The novel checkbook also tends to eliminate theft of individual checks, since these checks are so grouped that absence of one would be highly conspicuous.

It is a principal object of the invention to provide a portable checkbook which eliminates normal errors involving the recording of data placed on checks.

It is another object to provide such a checkbook which minimizes theft or loss of individual checks.

It is still another object of the invention to provide a checkbook in which salient data is simultaneously placed on a check and on a record sheet.

It is a further object to provide a checkbook in which the data on the record sheet may be arranged in columnar form for summary or tabulation.

It is a further object to provide such a book in which none of the salient data placed on any check is recorded on any other check.

It is a further object to provide a permanent record of data from any desired group of checks.

It is a further object to correlate a group of such records into a continuous record of desired length.

These and other objects will be apparent from the following specification and related drawings, in which:

FIGURE 1 is a perspective view of the novel checkbook as opened.

FIGURE 2 is a perspective view of the novel checkbook as closed, broken to expose a part of the topmost check.

FIGURES 3, 4, and 5 are plan views of a segment of the second, third, and fourth checks of the book.

FIGURE 6 is a plan view of the last of the checks in the book.

FIGURE 7 is a plan view of an alternative design of a check similar to the check of FIGURE 6.

FIGURE 8 is a plan view of the record sheet of the book.

FIGURE 9 is a plan view of a group of record sheets in sequential arrangement.

FIGURE 10 is a perspective view of an assembly of a number of checkbooks.

FIGURE 11 is a plan view illustrating a modification of the record sheet of FIGURE 8.

FIGURES 12, 13, and 14 are perspective views of modified forms of the checkbook of FIGURE 1.

Turning now to the drawings, FIGURES 1 and 2 illustrate the preferred, but not the only form of the invention, in which the checkbook 10 consists of a set of five checks 11, 12, 13, 14, and 15; a sheet of carbon paper 20; and a record sheet 17; all bound into a single book by conventional means along the lefthand binding 16. It is, of course, obvious that the location of the binding is optional and may just as well be at the top, bottom, or right-hand edge. The checks, carbon, and record sheet may be bound by gluing, stapling, or similar methods. The checks and the record sheet are perforated adjacent the bound edges to facilitate removal. It should be noted that checks 11, 12, 13, 14, and 15 are respectively printed in sequence as "101," "102," "103," "104," and "105," respectively, with the lowest number on top. The sheet 17 is extended beyond the free edges of the checks to form a supplementary portion 18; the extended portion 18 is preferably creased at the line of juncture 19 so that it may be folded over the top of the checkbook for use as a cover; or folded out of the way behind the book. As shown in FIGURE 2, the portion 18 is of proper length to form a cover.

It can be readily seen in FIGURE 1 that each of the checks has certain salient data on a single information line; these spaces are designated (in order from left to right) as DATE: PAY TO THE ORDER OF: FOR: AMOUNT: and NUMBER. This is the data that is normally scattered over the face of the check in conventional designs. In accordance with this novel arrangement as illustrated in FIGURES 1 to 6, the information line of each check below the top one is offset from the one above. The top check 11 has the information line 21 at the top; check 12, next below check 11, has the line 22 offset from line 21 by the width of the line; check 13, next below check 12, has the line 23 offset from line 22 by the width of one line; check 14, next below check 13, has the line 24 offset from line 23 by the width of one line; and finally, check 15, the bottom check, has its line 25 offset below line 24 by the width of one line; or may be said to have its line offset by four line widths below the line 21 of the top check 11. It should also be noted that the information line on each check is in registry with a corresponding line on the record sheet 17. All of the checks 11–15 are in full registry with each other and with the record sheet 17.

It should be noted that although only five checks are illustrated, other quantities of checks may be used in accordance with desired designs, and the quantity is only limited by the type of paper used for printing the checks, in conjunction with the method used for transferring the image.

The uppermost check 11 is illustrated in detail in FIGURES 1 and 2 in which the information line 21 is located at the top of the check. Similarly, succeeding checks 12, 13, 14, and 15 are illustrated in FIGURES 3, 4, 5, and 6. Each of these checks has an information line containing separate columns 26, 27, 28, and 29 in which may be written salient information by the author of the check; this information, respectively, is the DATE, the NAME OF PAYEE, the PURPOSE of the check, and the AMOUNT. Also, in the upper right-hand portion of each check is a preprinted number; in this instance the five checks shown are numbered in sequence from "101" to "105."

It is noted that all checks carry a bank identification number, designated by reference numeral 20a, preprinted just below the check number. This data may, of course, be located elsewhere on the check in accordance with accepted banking practices. At the same time, it is not necessary for the check number to be preprinted as shown; instead, the information line may be extended to the right-hand edge of the check and the number either could be preprinted at the right-hand edge of the line or could be added by hand. This alternative arrangement is illustrated in FIGURE 7, in which check 15a (similar to check 15) has the number "105" in the information line 25a. This arrangement may be optional for all other checks in the series.

As indicated above, the carbon sheet 20 is bound into the checkbook between the last check 15 of the series and the record sheet 17. It is only necessary to provide a single carbon, since pressure on any of the checks will be transmitted through the carbon onto the record sheet 17. At the same time, no writing will be transmitted to any other check below the one written on, since there are no intermediate carbons. The carbons sheet may be bound at its left-hand edge as shown in FIGURE 1; or at the top, bottom or right-hand edge (if the rest of the checkbook is so bound); or may even be inserted loosely.

When using a full size carbon sheet as shown, the user will fill in the information line of the top check, then remove it from the book to complete the remaining portion of the check. This provides recording of the only data intended to appear on the record sheet. However, it is also possible to use a carbon sheet which is narrower than the check, but equally as long. With this arrangement, the entire check may be filled out while still bound, and the impressions corresponding to information lines 21 to 25 will be transmitted, but none of the lower part of the check will be passed on to the record sheet.

Instead of using carbon paper, it is also possible to treat the face of the record sheet so that it is pressure sensitized. Such a process is described in United States Patent No. 2,548,366. It is also possible to limit the area of sensitization according to United States Patent No. 2,777,780, so that only the portion of the record sheet corresponding to the information lines will receive information from the checks, while the remainder of the record sheet will not. Other means of sensitization are equally well known but will not be further described.

It should be noted that the information lines are located in the upper portion of the check, leaving space in the lower portion for the additional required information such as a line for the written amount, the name of the bank, the name and address of the account owner, a printed code number, and a signature line in the lower corner. These may be located as shown in the drawings, but may be located where convenient on the checks, and in accordance with accepted banking practices.

FIGURE 8 illustrates in greater detail the record sheet 17, and the supplemental portion 18 which is a part thereof. Information lines 31, 32, 33, 34, and 35 correspond to information lines 21, 22, 23, 24, and 25 (respectively) of the checks above. Similarly, the columns 36, 37, 38, 39, and 40 correspond to check columns 26, 27, 28, and 29, and the preprinted numbers. The numbers in column 40 corresponding to the check numbers are preprinted at the right side of each of these lines; if desired, the numbers may be omitted or partially printed. The supplemental record sheet 18 contains additional lines and columns as shown for recording bank deposits, balances, distribution of expenses, tax items, budgeted items, or other desired data. The sheet is horizontally lined to correspond to information lines 31 to 35, so the data can be correlated. The extension 18 is shorter than 17 so it may be folded along line 19 to to form a cover, as shown in FIGURE 2, or folded out of the way.

In actual use, each check is written in turn, either by filling in the information line and removing from the book, or completing in place as described above. When the last check is written, information from each information line will have been recorded on record sheet 17 by one of the means described. The binding 16 and carbon sheet 20 are discarded, leaving only sheet 17 and extension portion 18. The column 39 may be added to provide a total of the checks written. Similarly, column 61 may be added to provide a total of deposits; these two totals may then be correlated to provide the account balance in column 62. The checks may further be broken down into expenses, taxes, etc. in columns 63 to 67, which in turn may be separately added. The portion 18 may have any arrangement of lines and columns desired to fit specific needs.

The sheet 17 is shown as having mounting holes 41 punched at one end. It is possible to mount sheet 17 as shown in FIGURE 9, together with similar sheets 17a and 17b (and extensions 18a and 18b). Each sheet continues the sequential numbering system. An indefinite number of sheets and extensions may be overlappingly mounted so that only the information lines are visible. This arrangement provides a quick reference to all data pertaining to the account. The holes 41 may be mounted on pins or rings; or the entire assembly may be fastened by gluing, stapling, or other means. While for pictorial purposes only three such sheets are shown, it is understood that the number of such sheets is only limited by practical considerations of space.

It is now obvious that at any time, the data desired by the check user is readily available for inspection. Further, the column 39 of sheets 17, 17a, 17b, etc., can be added when desired, to provide a total of all checks outstanding. Similarly, column 61 of supplemental portions 18, 18a, 18b, etc., can be added to give total deposits, and columns 63, 64, 65, and 66 can also be added to provide total expense or tax distribution. The assembly thus provides total columnar information.

FIGURE 10 illustrates a further utilization of the invention in which a series of checkbooks are bound together to form what amounts to a book containing more checks. The book 10, previously described, may be bound with similar books 42, 43, 44, and 45 in a clip or other binding member 46, thus providing 25 checks. The checks in these books will be sequentially numbered, for example, from "101" to "125." The assembly of books need not be limited to five as shown, but may include any desired quantity.

FIGURE 11 illustrates a variation of the invention in which a different type of record sheet may be utilized to eliminate the supplemental record sheet 18, shown as associated with record sheet 17. In this form of the invention, the record sheet 47 is similar to the sheet 17, insofar as the information lines at the upper portion are concerned. However, the lower portion of the sheet contains additional marked spaces for deposits and balance in order that a complete record may be obtained. In this case, the deposits are itemized and added to the previous balance; the total of the checks in the book is recorded and subtracted from the previous figure to provide a new balance.

It is obvious that other variations in record sheet design are possible, in accordance with the needs of the user.

FIGURE 12 illustrates a further modification of the invention, in which the checks and record sheets are arranged in a different manner. In this modification, the checkbook 50 is shown as containing fifteen checks, starting with 52 on top and 51 as the last one. Behind the check 51 is a sheet of carbon 53, and behind this are record sheets 54, 55, and 56. All the checks, carbon sheet, and record sheets are bound into the book by means of edge strip 57. The book is thus assembled as previously described, with optional carbon sheet 53 or treated record sheets.

The topmost check 52 has its information line 58 located as shown; this check is designed like check 15 of the principal form of the invention, so that it is the fifth in sequence. The second check down is similar to check 14 and has its information line offset upwardly. The next three checks down are like checks 13, 12, and 11. The sequence is then repeated twice, with the last check 51 also like check 11. The three record sheets 54, 55, and 56 are like the record sheet 17 previously described. In use the writer will first fill in the *last* check 51 (numbered "101"), the information on the top line being transferred to the record sheet 54. The other checks are written in order toward the top so that when five checks have been written the information lines on record sheet 54 are filled. The sheet 54 is then removed from the book, exposing sheet 55. The next five checks are written in the same order and the second record sheet 55 is filled, then removed from the book to expose record sheet 56. The top five checks are then written ending with check 52 (numbered "115"), and the last record sheet 56 is completed.

This modification provides a means by which many checks may be bound together; although only fifteen checks (and three record sheets) have been illustrated, it is understood that any number of checks and record sheets can be included in a single book, only limited by the desired thickness of the checkbook.

In the foregoing modification, it is also possible to replace the three record sheets 54, 55, and 56 by a single record sheet, designed of a width equal to the width of all record sheets and made to fold in the direction of the width. The first fold will contain information lines corresponding to the information lines on the first five checks; the second fold will have lines corresponding to the second five checks; and so on. As each group of checks is recorded, the proper fold exposes the next portion of the sheet.

Still another modification of the invention is illustrated in FIGURE 13, which is similar to that of FIGURE 1 except that the record sheet is placed over the checks, which are fully superimposed as before. The checkbook 70 has checks 71, 72, 73, 74 and 75 arranged in descending order so that check 71 is above the others. A carbon sheet 76 is located above check 71, and the record sheet 77 (with supplementary portion 78) is located above the carbon sheet. The checks, carbon sheet, and record sheet are bound at the edge binding 79 as shown. The checks are designed like checks 11–15 and the record sheet may be designed like record sheet 17, the modified form 47, or may have any other design. In lieu of the carbon sheet, the under side of the record sheet may be sensitized in the manner previously described. Other variations in this checkbook may follow those described above.

When this form of the invention is used, the writer of check will fill in the top information line 80 of the record sheet 77, which is on top. By means of the carbon or pressure sensitized coating, the information is carried on to the corresponding top information line at the top of check 71, which is then torn out and completed or completed in the book. The next time a check is to be written, the information line 81 is filled out, the data then being similarly passed on to the corresponding information line on check 72, which is offset as in check 12 of FIGURE 3. This check 72 is then removed and completed. The same procedure is followed for information lines 82, 83, and 84 and checks 73, 74, and 75. When all checks are completed, the binding 79 and carbon are discarded and the record sheet 77 with portion 78 is retained for file. This form of the invention, therefore, provides the same simultaneous recording of data on record sheet and checks as in the principal form of the invention.

FIGURE 14 illustrates a modification of the FIGURE 13 checkbook, in which fifteen checks and three record sheets are combined in a single book. This is similar to the FIGURE 12 form of the invention, except that the record sheets are superimposed over the checks as in FIGURE 13. The checkbook 90 consists of three record sheets 91, 92, and 93 which are superimposed on a carbon sheet 94 and on a series of fifteen checks starting with check 95 on top and ending with check 96. The check 95 is numbered "101" and the check 96 is numbered "115" so that these checks will be written starting with the one on top. These checks are designed as are the ones previously described. The record sheets are also like the record sheets previously described but are assembled so that the sheet 93 is filled in first; sheet 92 second; and sheet 91 third. In lieu of the carbon sheet 94, the back faces of the record sheets may be pressure sensitized.

In using the checkbook 90, the top information line of the third or lowermost record sheet 93 is filled out first, the data placed on this line transmitted by carbon or pressure coating to the corresponding information line on the first check 95. The check is removed and completed, or may be completed in the book, since there is no carbon below the check to transmit other data. When the next check is to be written, the second information line is filled out and the second of the checks, which is now uppermost, is then utilized in a similar manner. This process is continued for the top five checks, which completes record sheet 93, and sheet 93 is removed. The record sheet 92, which is now the lower of the two record sheets, is then utilized together with the next five checks in a similar manner. When sheet 92 is completed and removed, the remaining record sheet 91 and the last five checks (ending with 96) are similarly utilized. This provides a means for placing a larger number of checks in a book and enables the user to fill them out from the upper check down. It is possible, of course, to use more than fifteen checks and three record sheets in a single book, as desired.

In addition to the above configurations, other modifications are possible within the scope of the invention. All forms of the invention provide an arrangement for portable checkbooks where checks are written, and the salient information is simultaneously recorded on a single record sheet for all checks, without the necessity of rewriting information each time. The record sheet thus provides concise information in linear form, capable of columnar tabulation. While the invention has been described with reference to checks, it should be specifically noted that it can also apply to other types of documents such as bills, invoices, sales orders, receipts, purchase orders, and the like. All such documents are contemplated.

What is claimed is:

1. A checkbook comprising a plurality of series of detachable fully superimposed checks and a plurality of record sheets, each check having a single information line which is offset from the information line from any other check within the same series, each record sheet corresponding with a single series of checks and so arranged that the designated information placed on each check of the series is simultaneously recorded on said record sheet in sequential order, said record sheet capable of removal from said checkbook when said designated information from each of the checks within said series has been so recorded.

2. The checkbook of claim 1 in which each record sheet includes a supplemental portion having lines and columns thereon, said lines in alignment with the information recorded from said checks for entering related data therein, said columns arranged to provide tabulation of said data.

3. The checkbook of claim 2 in which said record sheet underlies the lowermost of said checks.

4. The checkbook of claim 2 in which said record sheet overlies the uppermost of said checks.

5. The checkbook of claim 1 in which all of said record sheets underlie the lowermost of said checks.

6. The checkbook of claim 1 in which all of said record sheets overlie the uppermost of said checks.

References Cited by the Examiner

UNITED STATES PATENTS

| | | | |
|---|---|---|---|
| 1,440,481 | 1/1923 | Middaugh | 282—23 |
| 1,955,369 | 4/1934 | Kelly | 282—23 |
| 2,678,223 | 5/1954 | Shepherd | 282—23 |
| 2,722,436 | 11/1955 | Pfeiffer | 282—29.2 |
| 3,048,426 | 8/1962 | Rodriguez et al. | 282—23 |
| 3,058,758 | 10/1962 | Govatsos | 282—23 |

FOREIGN PATENTS

| | | |
|---|---|---|
| 724,040 | 2/1955 | Great Britain. |
| 860,068 | 2/1961 | Great Britain. |

EUGENE R. CAPOZIO, *Primary Examiner.*

LAWRENCE CHARLES, *Examiner.*